US006840725B2

(12) United States Patent
Moore (10) Patent No.: US 6,840,725 B2
(45) Date of Patent: Jan. 11, 2005

(54) LOAD RESTRAINTS (76) Inventor: Anthony Moore, Tan-y-Byrn, Penline Road, Cilcain, Nr. Mold, Flintshire, North Wales (GB), CH7 5NZ ( * ) Notice: Subject to any disclaimer, the term of this patent is extended or adjusted under 35 U.S.C. 154(b) by 0 days.

(21) Appl. No.: 10/248,670

(22) Filed: Feb. 7, 2003

(65) Prior Publication Data

US 2003/0152437 A1 Aug. 14, 2003

(30) Foreign Application Priority Data

| Feb. 9, 2002 | (GB) | ............................................. 0203081 |
| Feb. 16, 2002 | (GB) | ............................................. 0203747 |
| Mar. 20, 2002 | (GB) | ............................................. 0205079 |

(51) Int. Cl.⁷ ............................................... B60P 7/08
(52) U.S. Cl. ................. 410/145; 410/121; 410/143; 410/150; 410/151; 410/155
(58) Field of Search ................. 410/121, 143–145, 410/150, 151, 155; 211/105.3; 248/354.5, 354.6

(56) References Cited

U.S. PATENT DOCUMENTS

| 2,226,373 | A | * | 12/1940 | Frear ........................... 410/151 |
| 2,912,939 | A | * | 11/1959 | Miner, Jr. et al. .......... 410/145 |
| 4,650,383 | A | * | 3/1987 | Hoff ............................. 410/149 |
| 4,772,165 | A | * | 9/1988 | Bartkus ....................... 410/139 |
| 5,509,764 | A |   | 4/1996 | Shives ......................... 410/150 |
| 5,934,850 | A | * | 8/1999 | Soumar et al. ............. 410/155 |
| 5,971,685 | A | * | 10/1999 | Owens ........................ 410/151 |
| 6,042,312 | A | * | 3/2000 | Durham, II ................. 410/143 |
| 6,062,780 | A |   | 5/2000 | Petelka ........................ 410/89 |
| 6,068,433 | A |   | 5/2000 | Baloga ........................ 410/145 |
| 6,074,143 | A |   | 6/2000 | Langston et al. ............. 410/89 |
| 6,238,154 | B1 | * | 5/2001 | DaPrato ...................... 410/151 |
| 6,582,169 | B1 | * | 6/2003 | Cano-Rodriguez et al. . 410/128 |

FOREIGN PATENT DOCUMENTS

DE    199 29 310 A 1    12/2000

OTHER PUBLICATIONS

Load Restraints for Safe Distribution; Rowlinson Packaging Limited; Nantwich, Cheshire, England.

* cited by examiner

Primary Examiner—Stephen Gordon
(74) Attorney, Agent, or Firm—Taylor Russell & Russell, P.C.

(57) ABSTRACT

A load restraint for use in a container is disclosed. The road restraint comprises a support to locate and extend generally vertically within a first locating formation (such as a corrugation in a wall) within a container. A transverse member extends from the support member across the container to engage with a second locating formation (such as another corrugation). A load engaging member is secured to the transverse member to extend from the transverse member to engage a load within the container. The load engaging member is adjustable in position with respect to the transverse member whereby it can contact a load spaced from the transverse member over a range of distances.

16 Claims, 8 Drawing Sheets

Fig 16

LOAD RESTRAINTS

BACKGROUND OF INVENTION

This invention relates to load restraints, and particularly to load restraints for fitting into a freight container or a freight-carrying vehicle.

For convenience, in this description, references to a "container" include the load space of a freight-carrying vehicle, unless the context demands otherwise.

When freight is packed into a container in many cases, the container is not completely filled. This may be because there is simply insufficient load available to fill the container, or it may be because the density of the load is such that a weight limit is reached before the container is filled. Shippers have a major problem for part loaded containers were there is substantial scope for movement of the product due to transit forces if the cargo is allowed to move longitudinally into free space within the container. Therefore, it is essential that the load be restrained to stop it moving within the container, since this could cause damage to the load or to the container.

SUMMARY OF THE PRIOR ART

Most containers are provided with lashing eyes that are intended to provide a locating point for ropes or straps or other retaining ties to secure a load. However, these have been found to be far from ideal in practice. These eyes are provided in the floor or wall of the container, which means that a tie attached to them is at a significant mechanical disadvantage in relation to the load. The effect of this is that any slack in the tie will result in the load having a proportionally large freedom to move. In practice, it has been found that a tie will always stretch after it has been fitted, so it is practically impossible to restrain the load securely using them. Once the load starts to move, it can cause large forces to be applied to the lashing eyes, especially during rough handling as might, for example, be experienced during a sea voyage. This has resulted in many cases of lashing eyes failing under load or due to fatigue.

Informal practice has used the vertical corrugations present in the walls of many containers as a location for timber beams to act as a fence for the load. However, these structures still allow the load to move by, on average, half the pitch distance of the corrugations, and up to a maximum of the whole pitch distance. This is still undesirable because preventing the load from moving at all requires less force than stopping it once it has started to move.

SUMMARY OF INVENTION

An aim of this invention is to provide a load restraint system that can be installed in any freight container that has suitable location formations (such as corrugations) and which can fix securely a load of substantially any size within the container.

From a first aspect, the invention provides a load restraint for use in a container comprising:

a. a support to locate and extend generally vertically within a first locating formation within a container;
 b. a transverse member to extend across the container to engage with a second locating formation; and
 c. a load engaging member secured to the transverse member that extends from the transverse member to engage a load within the container, the load engaging member being adjustable in position with respect to the transverse member whereby it can contact a load spaced from the transverse member over a range of distances;
 d. in which each of the locating formations is constituted by a corrugation in a wall of the container.

Thus, the load restraint system can be adapted to secure closely loads of various sizes.

The transverse member and support member may be interconnected by a hinge element. This can provide a restraint that is convenient to use and store. Alternatively, the transverse member and support member have interengaging portions to locate the transverse member in place.

The load engaging member may have a supporting leg upon which a load contacting member is carried. In some embodiments, the load engaging member has two supporting legs upon which a load contacting member is carried, the load contacting member extending between the supporting legs.

In a convenient configuration, the load engaging member includes a supporting leg that lies within a groove in the transverse member. In such cases, the load engaging member is typically secured to the transverse member by a clamping element such as a U-bolt. Alternatively, the load engaging member may include a supporting leg that passes through an aperture in the transverse member. In these embodiments, the load engaging member is typically located within the transverse member by a fastener that passes through the load engaging member and the transverse member.

Most usually, the support engages with an end portion of the transverse member. Some embodiments, have a further support member that engages with an opposite end of the support member.

The support member and/or the transverse member and/or the load engaging member may be formed of timber or of metal (steel) section.

A load restraint embodying the invention may have two similar load engaging members.

Typically, the load restraint is adapted for use with locating formations (e.g. corrugations) that are spaced along the length of a container. In such cases, the range over which the load engaging member can be adjusted is not less than the spacing between adjacent locating formations.

The restraint may be adapted for use with additional locating formations, for example, formations that are specifically provided for the purpose.

From another aspect, the invention provides a kit for constructing a load restraint for use in a container comprising:

a. a support suitable for location and to extend generally vertically within a first corrugation within a wall of a container;
 b. a transverse member suitable for extending across the container to engage with a second corrugation within an opposite wall of a container; and
 c. a load engaging member that can be secured to the transverse member to extend from the transverse member to engage a load within the container, the load engaging member being adjustable in position with respect to the transverse member whereby it can contact a load spaced from the transverse member over a range of distances.

DETAILED DESCRIPTION

Embodiments of the invention will now be described in detail, by way of example, and with reference to the accompanying drawings.

With reference first to FIGS. 1 to 5, a load restraint being a first embodiment will now be described.

Figure 1:
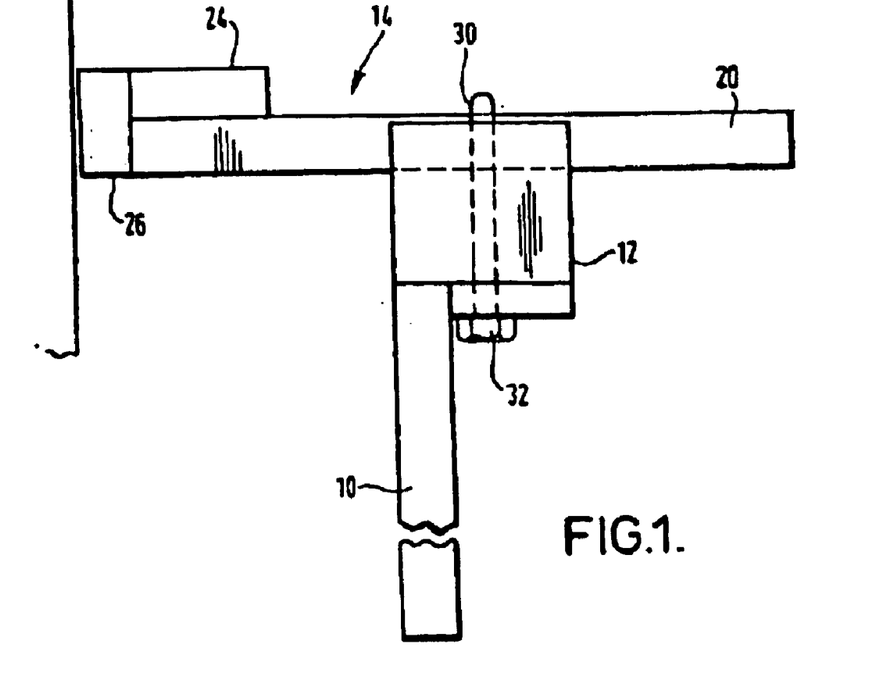
FIG. 1 is a side view a load restraint in being a first embodiment of the invention in against a load.
Figure 2:
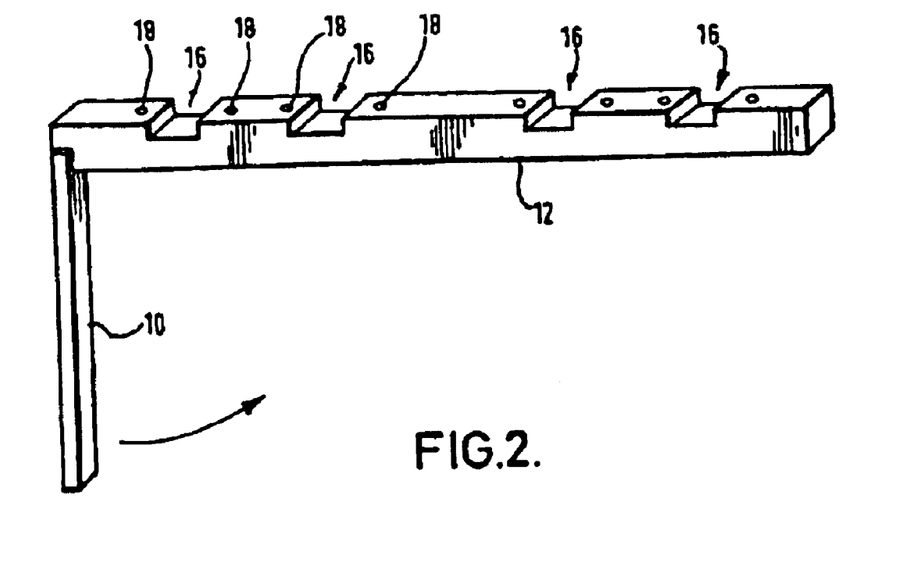
FIG. 2 shows a first and second component of the load restraint of FIG. 1.
Figure 3:
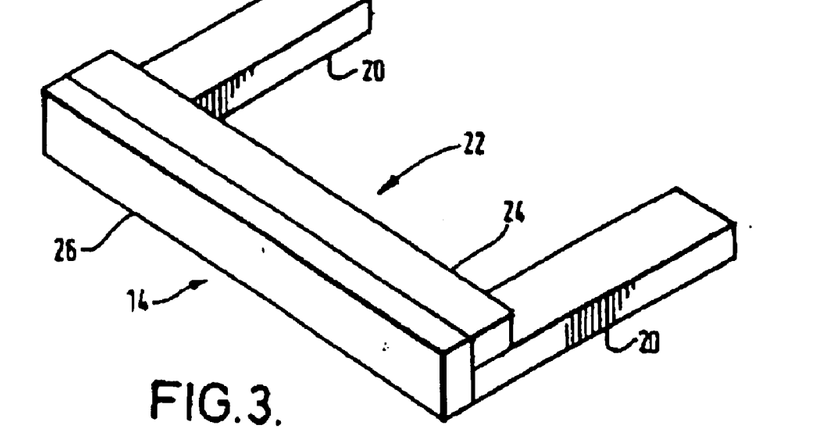
FIG. 3 shows a third component of the load restraint of FIG. 1.

The load restraint comprises a support member 10, a transverse member 12 and a load support 14. Each of these components can be formed from timber or fabricated from steel or other metal, as is convenient.

The support member 10 is a straight beam that has a flat lower end surface and a stepped upper end surface. The length of the support member is less than the height of a container into which it is to be used, and less than the height of a load that it is intended to restrain. (In embodiments that are made of wood, the height can easily be lessened by cutting the support member as required.)

The transverse member 12 is rectangular section a beam of length slightly greater than the width of the container into which the restraint will be installed. An end surface of the transverse member 12 is formed with a step that fits into the corresponding step at the top of the support member 10. An upper surface of the transverse member 12 has two pairs of rectangular section grooves 16 extending across it. To each side of each of the grooves 16 a pair of holes 18 is formed through the transverse member 12. (Note that the grooves can either be formed in the material of the transverse member, or can be defined between blocks applied to the transverse member.)

The load support 14 is formed from two rectangular section leg members 20 that are spaced apart and extend generally parallel to one another. The leg members 20 are interconnected by a connecting member 22 for contact with the load. In this embodiment, the connecting member comprises two rectangular section beams 24, 26, one being attached (for example, by nails or by welding, as appropriate) to an end surface of the legs 20 and the other being attached to a surface of the legs 20 that is, in use, directed upwards. The spacing between the legs 20 of the load support corresponds to the spacing between each pair of grooves 16 in the transverse member 12. The width of the legs 20 is slightly less than the width of the grooves 16.

To install the load support, the support member 10 is first placed in a corrugation of a wall of a loaded container as close as possible to the load. It may be held there, for example, by adhesive, an adhesive strip, by magnets, by a strip of magnetic material, and so forth, secured to it. As will be seen, it need be held there with only as much strength to stop it falling while the support is installed.

The transverse member 12 is then placed on the support member 10 such that the stepped end of the transverse member 12 engages with the stepped top of the support member 10. The transverse member can then be lowered such that an end portion of it enters a corrugation on the opposite side of the container. Given that its length is greater than the width of the container, the transverse member is angled upwardly from the support member 10 and is effectively wedged across the container. The end surface of the transverse member 12 can be cut at an angle to lie flat against the wall of the container.

The load support 14 is then placed onto the transverse member 12 with its legs 20 in the grooves 16. For each leg 20, a U-bolt 30 is installed, over the leg 20, shafts of the U-bolt 30 passing through the holes 18, and nuts 32 (for example, self locking nuts or nuts with locking washers) are applied to threads of the shafts. The load support 14 is then pushed against the load, and the nuts 32 are tightened to clamp the load support 14 against the transverse member. The load support is thereby held in place against the load. A second load support 14 can likewise be installed at the second pair of grooves. In cases where the legs 20 of the load support 14 are formed from wood, the U-bolt 30 will typically bite into the legs, thereby enhancing the grip upon them.

Figure 5:
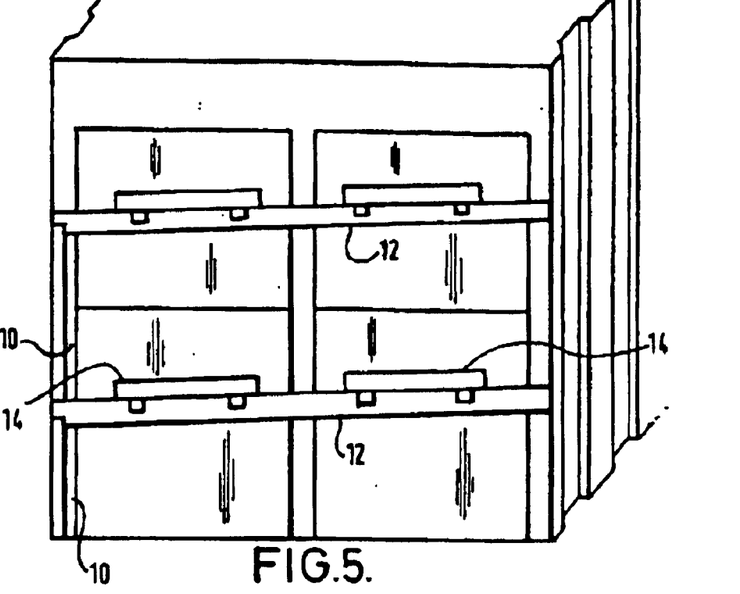
FIG. 5 shows two load restraints similar to that shown in FIG. 1 installed in a container.

If necessary, a further load restraint can be installed in the same corrugations vertically above the restraint described, as shown in FIG. 5.

The innovation includes the scope to manufacture the beam with separate pieces of timber and/or steel positioned along the top of the beam to generate the slots. The innovation to include the option to have the crossbeams without the four cross-slots but still with the eight holes for the four U-bolts.

Figure 3A:
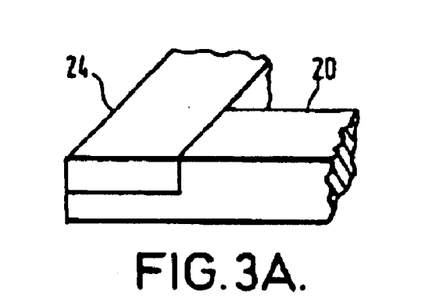
FIGS. 3a and 3b are detailed views of alternative constructions of the component of FIG. 3.
Figure 3B:
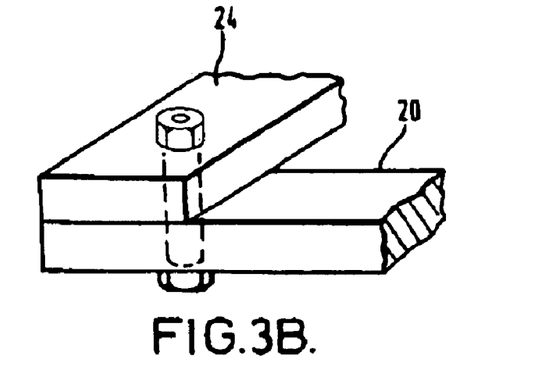
Figure 4:
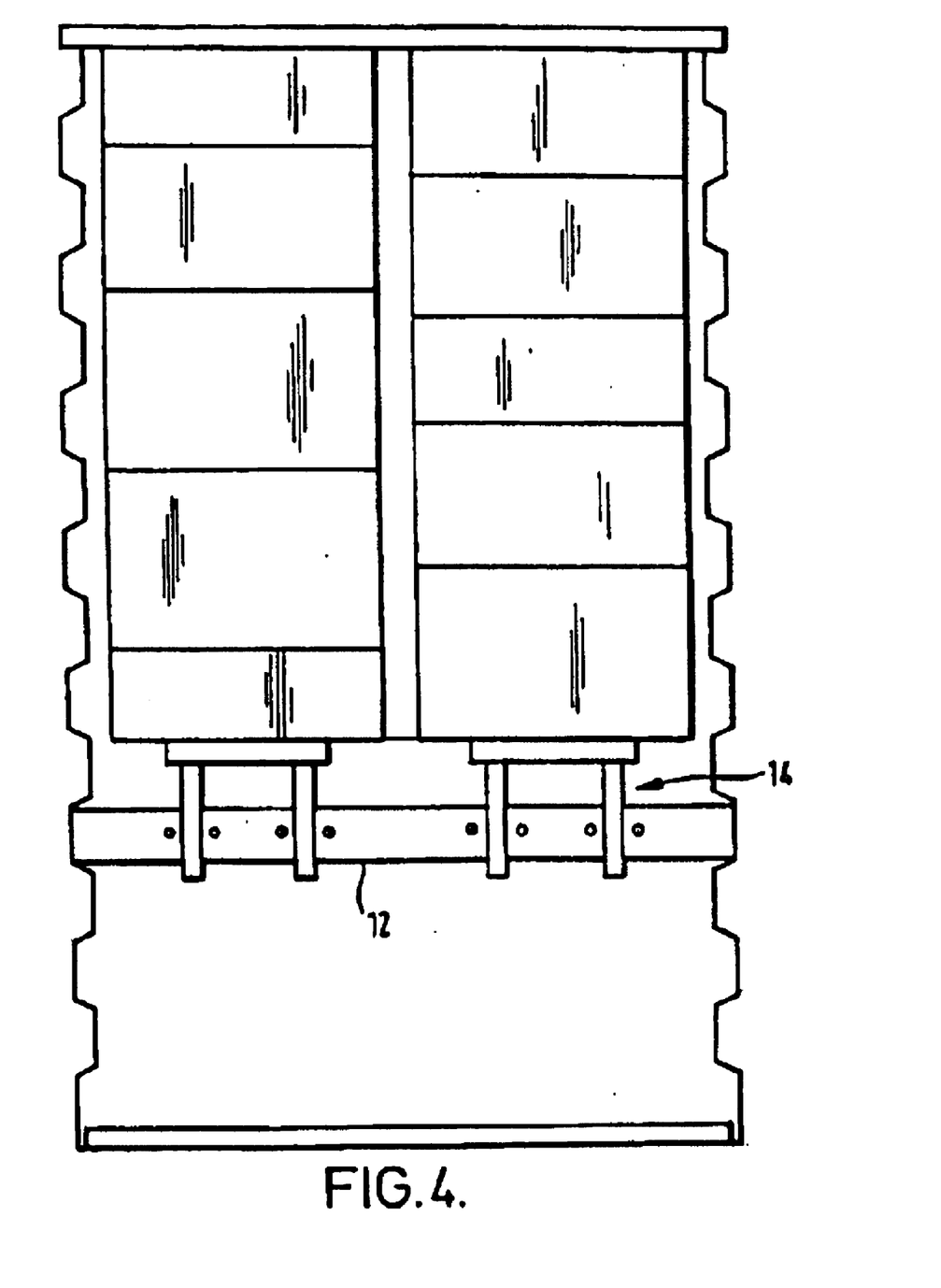
FIG. 4 is a plan view of the load restraint of FIG. 1 in place on a container.

The arrangement of load support described is made from four pieces of timber or hollow section steel. This can be reduced to a three pieces, joined together by a coach bolt (see FIG. 3b) or a nailed and bolted half lap joint for the timber construction as shown in FIG. 3a.

Any excess length of the legs 20 of the load support 14 projecting past the transverse member 12 can be cut flush in situ, if necessary, after the restraint has been installed.

It has been found that one or two standard lengths of the transverse member 12 should cover the majority of requirements, but the invention includes the option to supply one standard excess length member, which can be cut a required length longer than the container width found at time of fitting, to match a specific container's dimensions. This would cope with non-standard or damaged containers.

The section sizes of the components are selected to provide the strength of load restraint required. This will give scope also to provide beam section of smaller size to fit in a single narrow corrugation (compared to the main wider corrugations in the freight container proper) which is typically positioned close to the container door on containers, these being applicable to part loads finishing close to the container doors.

The restraint described above supports directly against the cargo face but can also be used to secure other dunnage (gates, boards, pallets etc) in position against the cargo face if desired.

The transverse member 12 can also be used as a lashing point if required for special needs.

Figure 6:
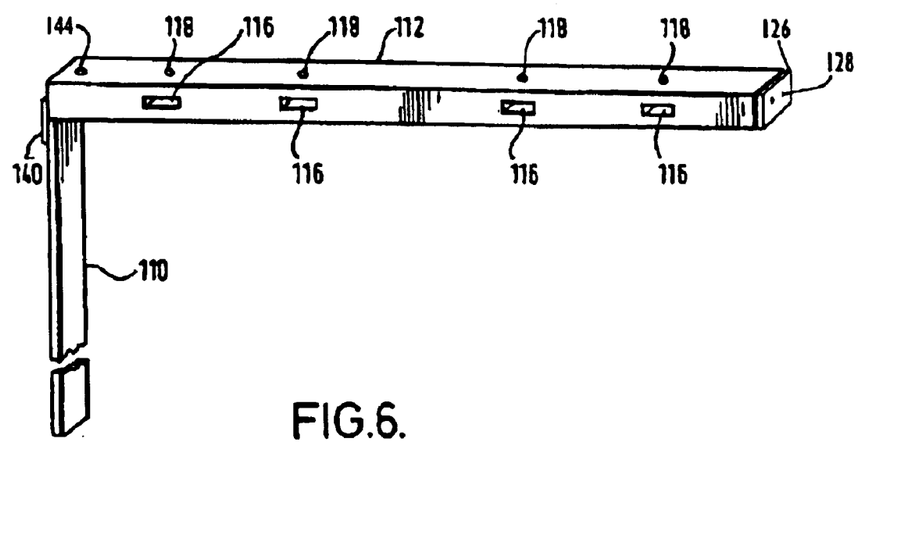
FIG. 6 is a view similar to that of FIG. 2 of a second embodiment of the invention.

With reference now to FIG. 6, in a second embodiment of the invention, the support member 110 and the transverse member 112 are interconnected by a hinge.

In a first modification to the embodiment described above, the support member 10 and the transverse member 12 are interconnected by a flexible fabric or metal hinge 140. The hinge 140 allows the two members to be folded such that they overlie one another; a convenient configuration for storage.

Figure 7:
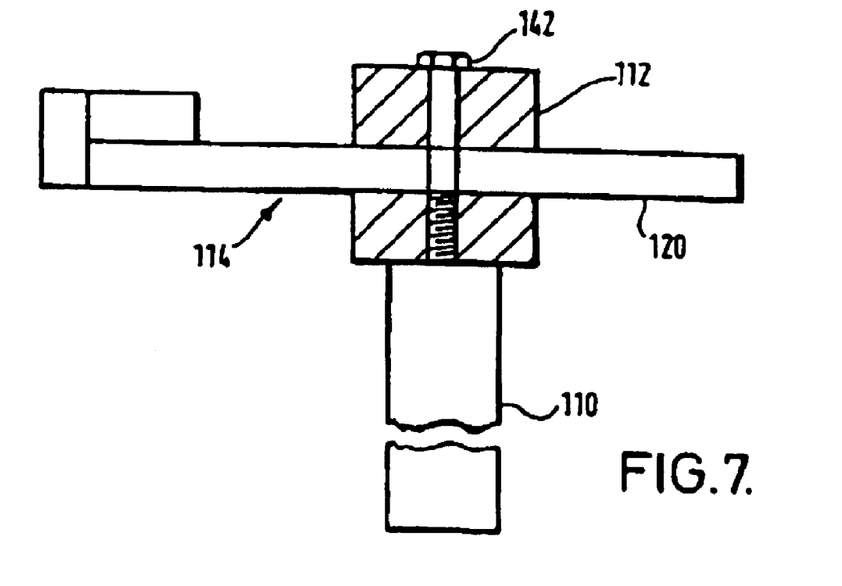
FIG. 7 is a transverse view, similar to that of FIG. 1; of the second embodiment of the invention.

In this embodiment, instead of grooves 16, rectangular slots 116 are formed through the transverse member 112. Bolt holes 118 are formed through the transverse member 112 to intersect with each of the slots.

To install a load restraint of this embodiment, the legs 120 of the load support 114 are inserted through the slots 116 in the transverse member before the support member 110 and the transverse member 112 are installed in the container. After installation, the load restraint 114 is pushed against the load. The installer then inserts a drill into the bolt bole 116 and drills through the leg 120. A bolt 142 can then be inserted through the bolt holes 116 and the drilled hole, and then secured by a nut, to retain the load restraint 114 in place against the load. (Alternatively, a self-tapping coach bolt can be used instead, and the drilling step can be omitted.)

A further hole 144 is provided in this embodiment through the transverse member 112 above the support member 110. An aligned hole is formed in the upper part of the support member 110. A bolt or a screw can be inserted into the hole 144 to resist downward folding movement of the transverse member 112 in relation to the support member 110.

In order to accommodate a wider range of container widths, one or more optional packing pieces 126 may be secured to one or both end surface of the transverse member 112. This is applicable to many embodiments as well as to the present embodiment. For instance, the packing pieces may be of wood such as plywood and retained in place by nails 128 driven through them into the transverse member. Application of such packing pieces can adapt the system for use in a container that is wider than would normally be expected with a transverse member of standardized length.

Figure 8:
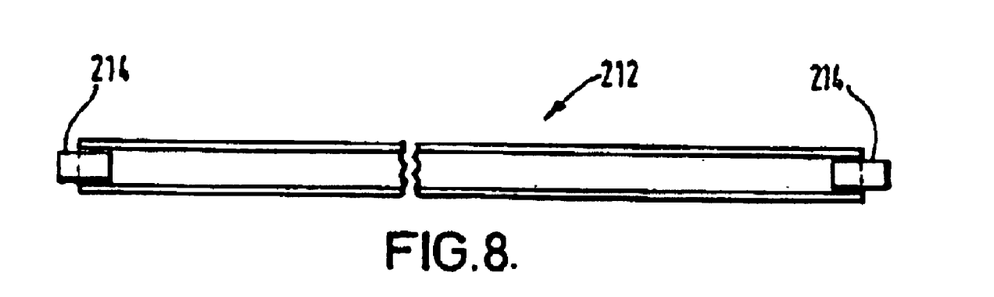
FIG. 8 shows an alternative configuration of a transverse beam component for use with embodiments of the invention.
Figure 8A:
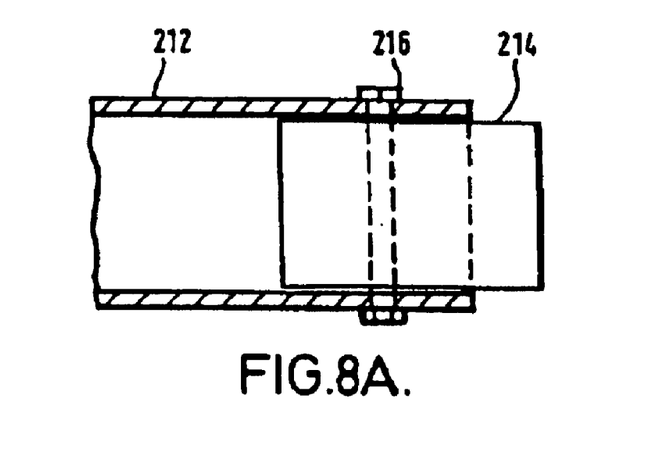
FIG. 8a is an enlarged detailed view of an end portion of the component of FIG. 1.

As shown in FIGS. 8 and 8a, the transverse member 212 can be formed from hollow steel section. Optionally, to accommodate containers of different widths, inserts 214, for example of timber, can be inserted into the end portions of the transverse member. A hole is formed through the transverse member, and several holes are formed through the insert 214 through which a bolt 216 can be inserted to retain the insert 214 in position. By providing a plurality of holes in the insert 214, the position of the insert with respect to the transverse member 212 is adjustable. The timber inserts could be bolted in as shown or nailed in position through the respective holes in the hollow section.

Figure 9:
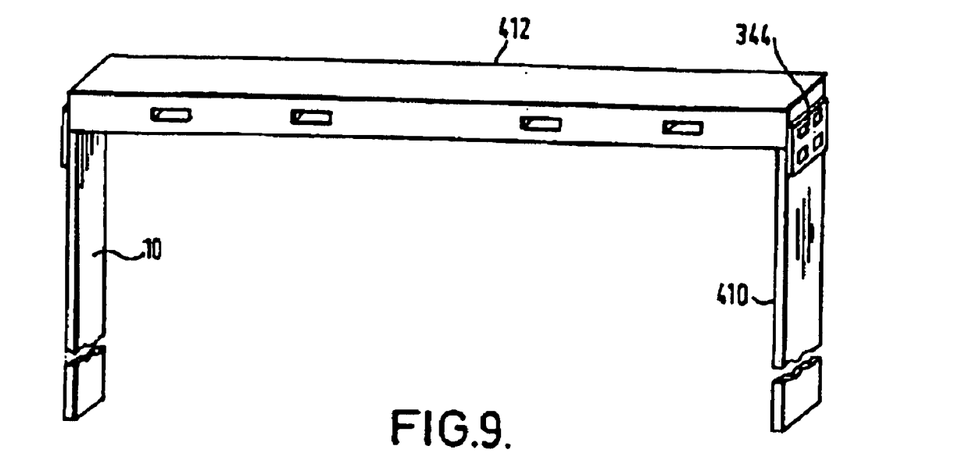
FIGS. 9 and 10 show third and fourth embodiments of the invention.
Figure 10:
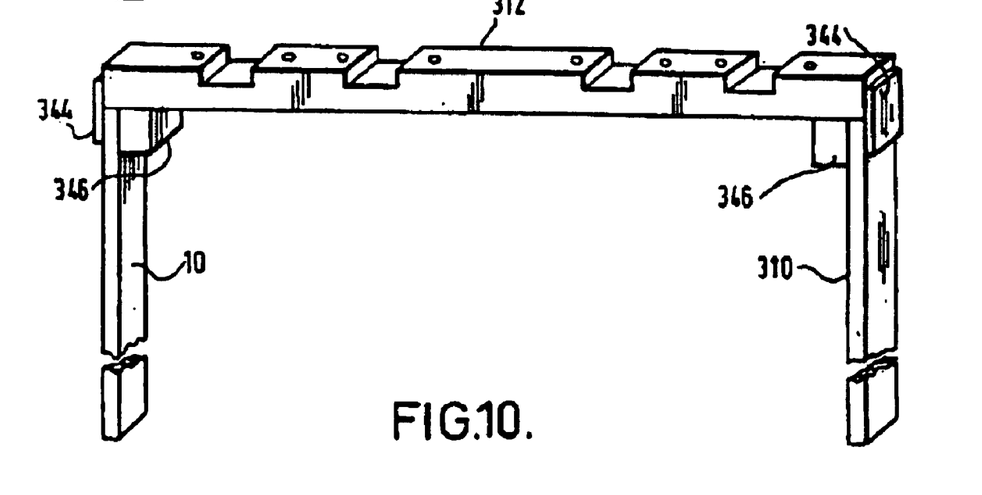
Figure 10A:
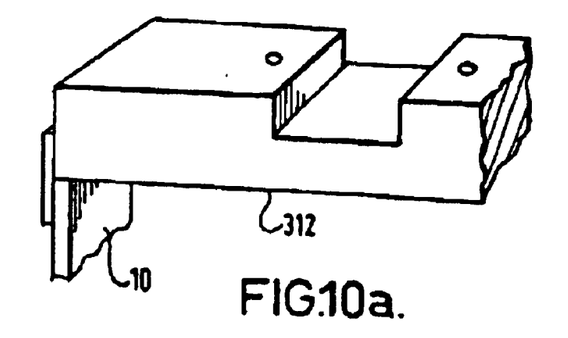
FIGS. 10a and 10b are detailed views of part of the embodiment of FIG. 10.
Figure 10B:
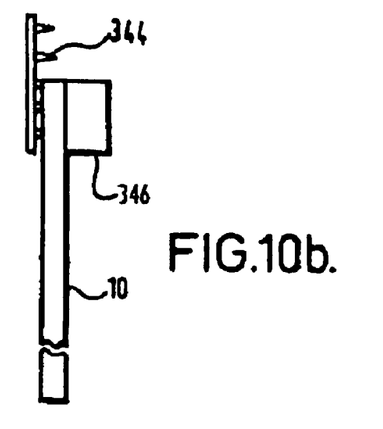

In the embodiments of FIGS. 9 and 10, a further support member 310, 410 is provided to minimize the risk that the transverse member 12 can fall, for example if the container deflects under load.

A block 346, shown in FIG. 10, is fitted to the top end portion of the support member 10 to increase the width of the top of the support member 10 for supporting the transverse member. This enables the lower part of the support member 10 to be slimmer, such that it can be contained within the corrugation to as great as possible an extent. This allows further cargo to be positioned below the supporting leg 10 without interfering with the support leg, as might happen if the load restraint is to be installed at an upper level above a fully-occupied floor-level cargo.

Figure 11:
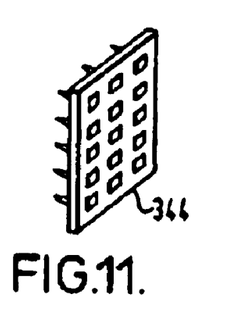
FIG. 11 is a gang nail component that can be used with embodiments of the invention.

A metal strip, gang-nail or plate 344, as shown in FIG. 11, may be attached to the top end of the support member 10. This enables the leg to be secured in the container corrugation when the transverse member 12 is rested on the top of the support member 10. The attachment on the end is sandwiched in position between the end of the beam and the container corrugation.

Figure 14:
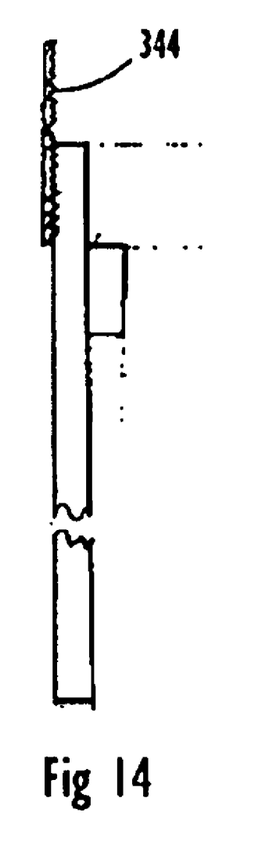
FIGS. 14 to 16 show modifications to the embodiment of FIGS. 9 and 10.
Figure 15:
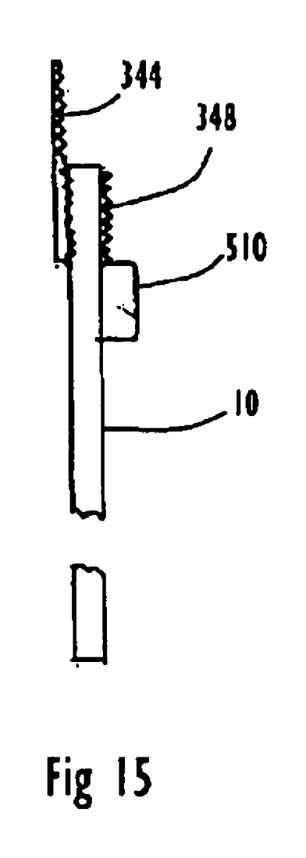
Figure 16:
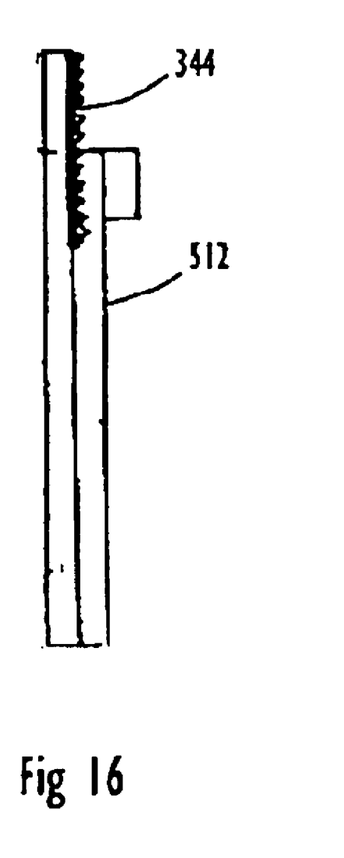

In a modification to this arrangement, shown in FIGS. 9 and 10, as shown in FIGS. 14 and 15. In this embodiment, the support member 10 has a block 510 mounted on its inward-facing surface spaced from its top. An optional second gang nail 348 is mounted on the inward-directed surface above the block 510. Thus, the transverse member can be supported either on the top of the support member 10 or upon the block. The latter case moves the transverse member towards the opposite side of the container as compared with the former case, thereby providing for additional flexibility of accommodating a wide range of container widths. In further embodiments, more than one block may be provided to further increase the flexibility of the load restraint.

A yet further embodiment, shown in FIG. 15, provides an additional support leg 512 instead of a block.

Figure 12:
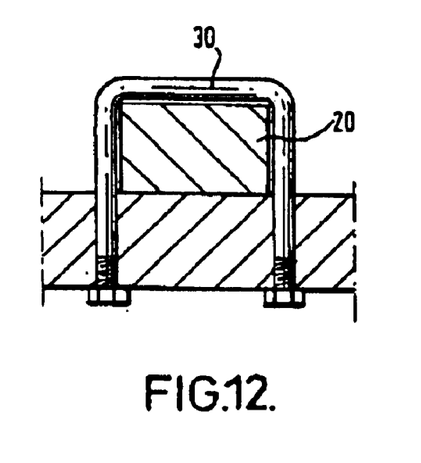
FIGS. 12 and 13 are cross-sectional views of alternative embodiments of a load-engaging component of a load restraint embodying the invention.
Figure 13:
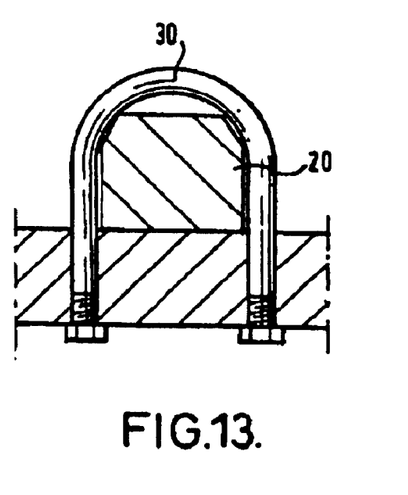

Modifications to the embodiments of the load restraints described above that use a U-bolt to secure the load-support will now be described. In order to reduce the length and projection of the U-bolt 30, it may be formed with a square section to surround the legs 20 more closely, as shown in FIG. 12. However, it may be more effective to shape the legs 20 (at least in the region of the U-bolts) with a chamfer to accommodate a conventional rounded U-bolt, as shown in FIG. 13.

What is claimed is:

1. A load restraint for use in a container, the container having a first wall and a second wall opposite the first wall, the first and second walls including a plurality of generally vertical corrugations, the load restraint comprising:
   a. a support to locate and extend generally vertically within a first locating formation within the first container wall;
   b. a transverse member to extend across the container to engage with a second locating formation within the second container wall;
   c. a load engaging member secured to the transverse member and extending from the transverse member to engage a load within the container, the load engaging member being adjustable in position with respect to the transverse member whereby it can contact a load spaced from the transverse member over a range of distances; and
   d. a plurality of locating formations being corrugations spaced along the generally horizontal length of the first container wall and a plurality of locating formations being corrugations spaced along the generally horizontal length of the second container wall, the locating formations providing adjustment of the engaging member wherein the adjustment is not less than the spacing between adjacent ones of said locating formations.

2. A load restraint according to claim 1 in which the transverse member and support are interconnected by a hinge element.

3. A load restraint according to claim 1 in which the transverse member and support have interengaging portions to locate the transverse member in place.

4. A load restraint according to claim 1 in which the load engaging member has a supporting leg upon which a load contacting member is carried.

5. A load restraint according to claim 1 in which the load engaging member has two supporting legs upon which a load contacting member is carried, the load contacting member extending between the supporting legs.

6. A load restraint according to claim 1 in which the load engaging member includes a supporting leg that lies within a groove in the transverse member.

7. A load restraint according to claim 1 in which the load engaging member is secured to the transverse member by a clamping element.

8. A load restraint according to claim 7 in which the clamping element includes a U-bolt.

9. A load restraint according to claim 1 in which the load engaging member includes a supporting leg that passes through an aperture in the transverse member.

10. A load restraint according to claim 9 in which the load engaging member is located within the transverse member by a fastener that passes through the load engaging member and the transverse member.

11. A load restraint according to claim 1 in which the support engages with an end portion of the transverse member.

12. A load restraint according to claim 1, wherein;
the support includes a first support and a second support, the first support located and extending generally vertically within the first locating formation and the second support located and extending generally vertically within the second locating formation: and
the traverse member includes a first end and a second end, the first end engaging the first support and the second end engaging the second support.

13. A load restraint according to claim 1 in which the support and/or the transverse member and/or the load engaging member are formed of timber.

14. A load restraint according to claim 1 in which the support and/or the transverse member and/or the load engaging member are formed of metal section.

15. A load restraint according to claim 1, wherein the load engaging member includes two similar load engaging members.

16. A kit for constructing a load restraint for use in a containers, the container having a first wall and a second wall opposite the first wall, the first and second walls including a plurality of generally vertical corrugations, the load restraint comprising:

a. a support suitable for location and to extend generally vertically within a first corrugation within the first container wall;

b. a transverse member suitable for extending across the container to engage with a second corrugation within the second container wall, c. a load engaging member that can be secured to the transverse member and extending from the transverse member to engage a load within the container, the load engaging member being adjustable in position with respect to the transverse member whereby it can contact a load spaced from the transverse member over a range of distances; and d. the plurality of corrugations spaced along the generally horizontal length of the first container wall and the plurality of corrugations spaced along the generally horizontal length of the second container wall, the corrugations providing adjustment of the engaging member wherein the adjustment is not less than the spacing between adjacent ones of said corrugations.

* * * * *